United States Patent [19]

Iijima

[11] Patent Number: 4,901,276

[45] Date of Patent: Feb. 13, 1990

[54] PORTABLE ELECTRONIC APPARATUS HAVING A FUNCTION OF CHECKING FOR EMPTY AREAS IN WHICH TO WRITE DATA

[75] Inventor: Yasuo Iijima, Yokohama, Japan

[73] Assignee: Kabushiki Kaisha Toshiba, Kawasaki, Japan

[21] Appl. No.: 319,856

[22] Filed: Mar. 6, 1989

Related U.S. Application Data

[63] Continuation of Ser. No. 63,655, Jun. 18, 1987, abandoned.

[30] Foreign Application Priority Data

Jun. 20, 1986 [JP] Japan ................................. 61-144116

[51] Int. Cl.$^4$ ..................... G06F 12/06; G06F 12/14; G06F 13/12
[52] U.S. Cl. .................................... 364/900; 235/380; 364/918; 364/918.2; 364/918.7; 364/927; 364/927.2; 364/927.4; 364/928; 364/930; 364/932; 364/932.1; 364/947.2; 364/949.7; 364/952; 364/952.1; 364/959.1; 364/964; 364/964.1
[58] Field of Search ....................... 364/200, 300, 900; 235/380

[56] References Cited

U.S. PATENT DOCUMENTS

| 4,348,740 | 9/1982 | White | 364/900 |
|---|---|---|---|
| 4,520,441 | 5/1985 | Bandoh et al. | 364/200 |
| 4,523,297 | 6/1985 | Ugon et al. | 364/900 |
| 4,575,621 | 3/1986 | Dreifus | 235/380 |
| 4,833,595 | 5/1989 | Iijima | 364/200 |

OTHER PUBLICATIONS

Translation of Office Action for German Patent Application No. P 37 20 394.0-53.
Computer Systems Organization and Programming, Science Research Associates, Inc., Harry Katzan, Jr., 1976, pp. 309–322.

Primary Examiner—Raulfe B. Zache
Attorney, Agent, or Firm—Cushman, Darby & Cushman

[57] ABSTRACT

The portable electronic apparatus of the invention has a memory for storing externally-supplied data, and a central processing unit (CPU 15) for accessing the memory. The memory is divided into a plurality of areas. Each area has pointer data indicating a final address at which the data is written in that area, and a table that lists start and end addresses of each area. A write instruction to be supplied to the portable electronic apparatus consists of a write function code field, a write area designating field, a data string length field, and a data string. The CPU refers to the table based on the write area designating field of the supplied write instruction, reads an end address of the designated area and pointer data, and subtracts the pointer data from the end address, thereby calculating a memory capacity. Furthermore, the CPU compares the calculated memory capacity with the data string length of the write instruction, determines whether the data string can be entirely written, and writes the data string only when it is determined that it can be entirely written.

5 Claims, 17 Drawing Sheets

| 20 | 22 | 24 | 26 |
|---|---|---|---|
| AREA NUMBER | THE NUMBER OF BYTES | START ADDRESS | FINAL ADDRESS |
| 01 | 5 | a a a | b b b |
| 02 | 4 | c c c | d d d |
| 03 | 4 | e e e | f f f |
| ⋮ | ⋮ | ⋮ | ⋮ |
| F E | 5 | g g g | h h h |
| F F | 3 | i i i | j j j |

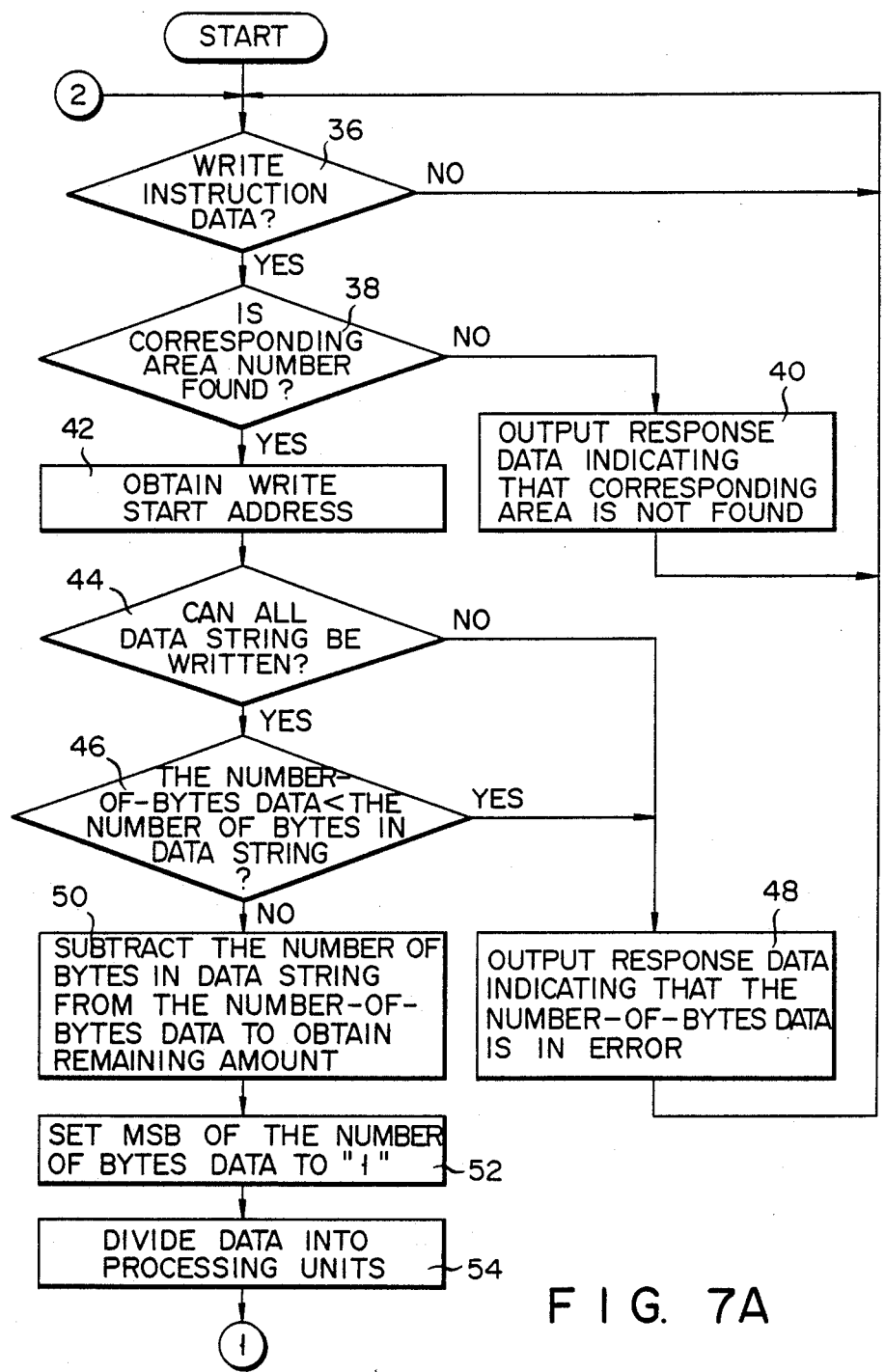
F I G. 7A

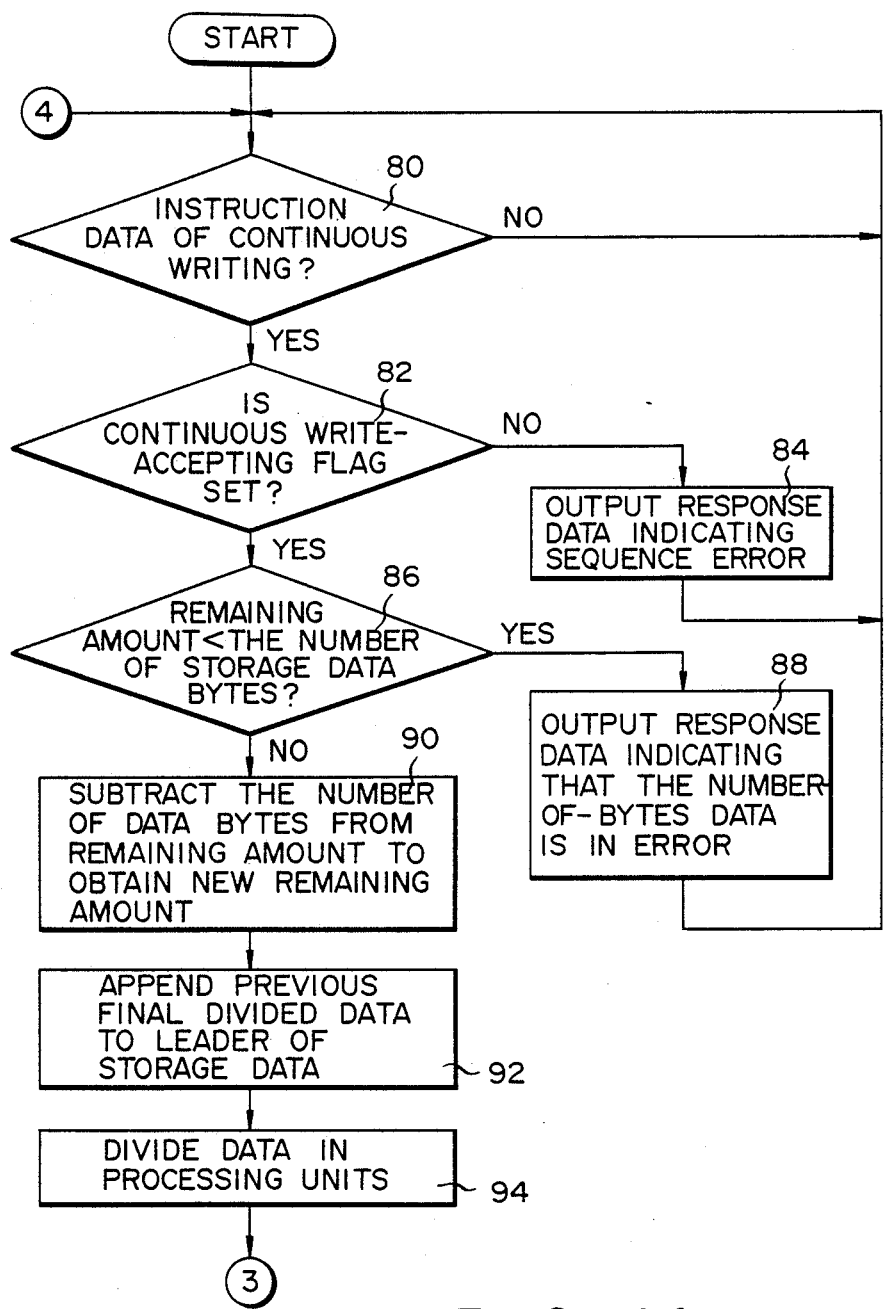
F I G. 9A

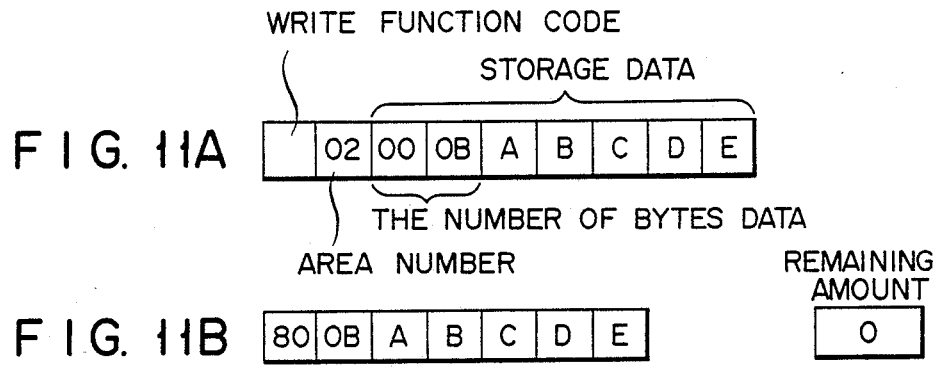
FIG. 11A
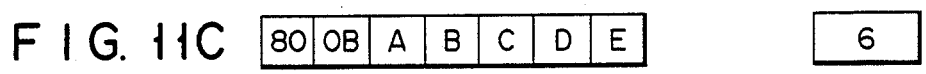
FIG. 11B
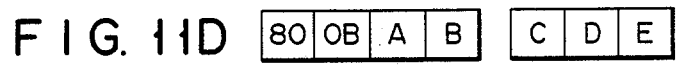
FIG. 11C
FIG. 11D
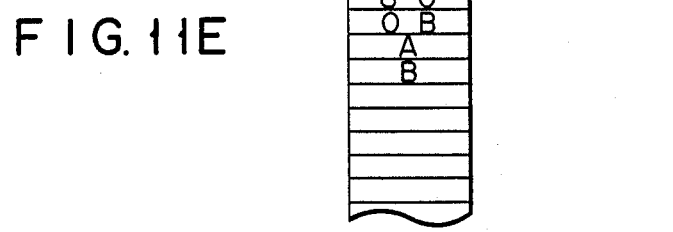
FIG. 11E
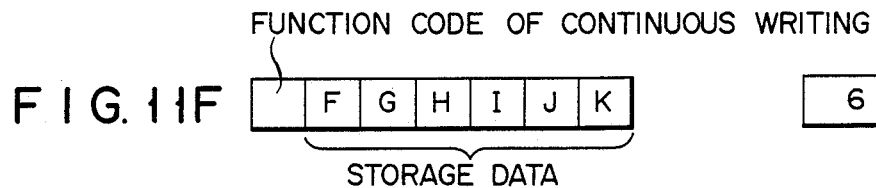
FIG. 11F
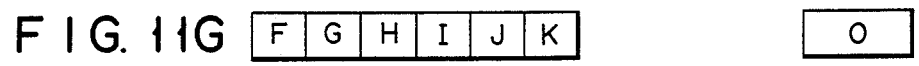
FIG. 11G

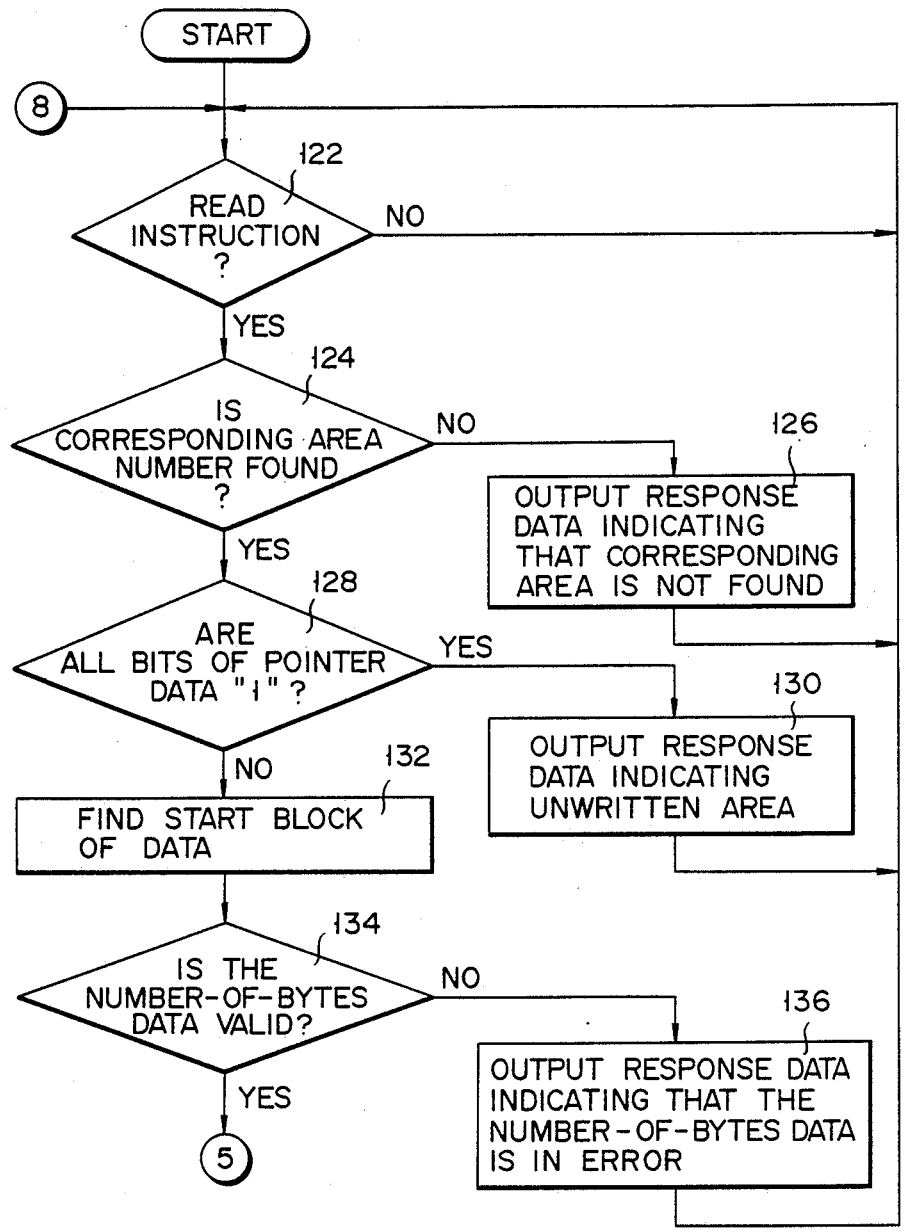
F I G. 12A

AREA NUMBER
READ FUNCTION CODE

00 | 0B | A | B | C | D | E | F

00 | 0B | A | B | C | D | E | F
CODE INDICATING ACCEPTANCE OF CONTINUOUS READING

AREA NUMBER
CONTINUATION READ FUNCTION CODE

G | H | I | J | K
CODE INDICATING COMPLETION OF READ OUT

G | H | I | J | K

COUNTER 5

PORTABLE ELECTRONIC APPARATUS HAVING A FUNCTION OF CHECKING FOR EMPTY AREAS IN WHICH TO WRITE DATA

This is a continuation of application No. 07/063,655, filed June 18, 1987, which was abandoned upon the filing hereof.

BACKGROUND OF THE INVENTION

The present invention relates to a portable electronic apparatus which is called an IC card and incorporates an IC (integrated circuit) having, e.g., a nonvolatile data memory and a control element such as a CPU (central processing unit).

Recently, IC cards incorporating IC chips having nonvolatile data memories and control elements such as CPUs have begun to prevail as a new portable data storage medium. The data stored in the data memory incorporated in such an IC card is managed by an internal control element or an external unit.

As a method to access such an IC card, a random access is performed wherein the data memory is divided into a plurality of areas and the respective areas are accessed. In this case, specific data such as a start address of the target area and the number of bytes constituting the area is registered in the IC card. When the target area data is added to input instruction data, the specific data of the target area in the IC card is searched, converted into physical access data, and processed.

However, in a conventional IC card, when data strings are to be written in a target area, they are stored in the order they are input. Response data indicating an input data number error and so on is output only when it is discriminated that no more input data can be stored. In this case, during writing, a data string must be invalidated by some means. For this purpose, conventionally, it is logically invalidated by a flag indicating invalidity of the data string, or this abnormal data string is erased, thereby preventing adverse effects on the subsequent data management.

In this manner, in the conventional IC card, determination whether a data string can be entirely stored in a target area can be known only by a write operation. Therefore, excessive write operations must be performed, the physical service life of the memory is degraded, and protectability of the data in the IC card system is also degraded.

SUMMARY OF THE INVENTION

It is an object of the present invention to provide a portable electronic apparatus wherein excessive write operations need not be performed, the physical service life of the memory is increased, and the protectability of data is also increased.

In order to achieve the above object, the portable electronic apparatus of the present invention comprises a contactor section to be connected with a portable electronic apparatus handling system capable of supplying to the portable electronic apparatus a write instruction consisting of a write function field, a write area number field, a write data string length field, and a write data string field; storage means which is divided into a plurality of areas, each of the areas having a pointer data field indicating a final location thereof where data is written, and which stores at least a final address of each of the areas in a specific area and a data string supplied from the portable electronic apparatus handling system; and control means for reading out from the storage means to final address of the area designated by a write area number field of the write instruction and pointer data from the storage means in response to a write instruction supplied from the portable electronic apparatus handling system, calculating a memory capacity from their values, comparing the calculation result with a value of a data string length field of the write instruction, determining whether a data string which has been requested to be written can be entirely written, and controlling writing to the storage means in accordance with the determination result.

According to the portable electronic apparatus of the present invention, checking to determine whether there is an area in which a data string can be written is performed immediately before the data string is written in that area, and the data string is written only when such an area exists. Therefore, excessive write operations need not be performed.

BRIEF DESCRIPTION OF THE DRAWINGS

Other objects and features of the present invention will be apparent from the following description taken in connection with the accompanying drawings in which:

FIGS. 7A and 7B are flow charts of the write operation for the data memory shown in FIG. 3;

FIGS. 9A and 9B are flow charts of the continuous write operation for the data memory shown in FIG. 3;

FIGS. 11A through 11J are diagrams for explaining a practical writing operation shown in the flow charts of FIGS. 7A and 7B;

FIGS. 12A through 12C are flow charts showing a read operation for the data memory shown in FIG. 3;

DETAILED DESCRIPTION OF THE PREFERRED EMBODIMENTS

An embodiment of the present invention will be described with reference to the accompanying drawings.

Figure 1:
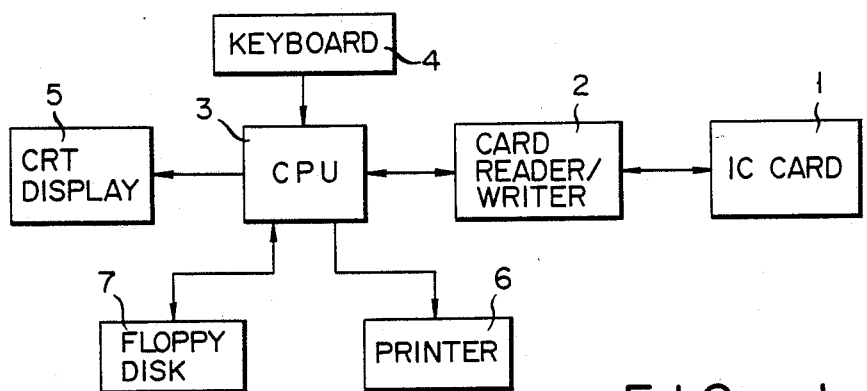
FIG. 1 is a block diagram showing the arrangement of a card handling unit used as a terminal unit of a home banking system or a shopping system which adopts an IC card as the portable electronic apparatus according to the present invention.
Figure 2:
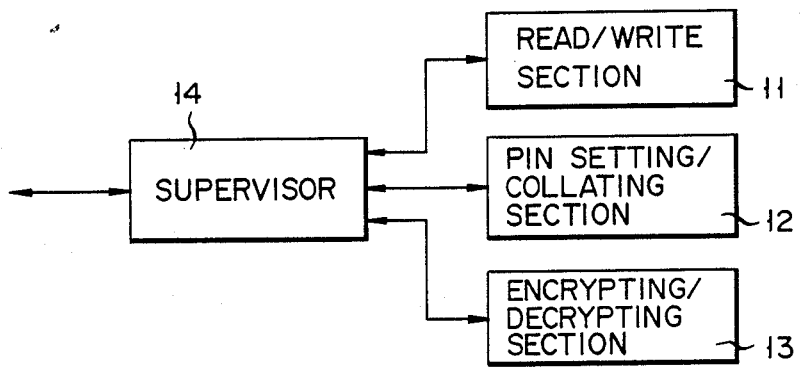
FIG. 2 is a block diagram of the IC card as the portable electronic apparatus according to the present invention.

FIG. 1 shows an arrangement of a card handling system used as a terminal unit of, e.g., a home banking system or a shopping system which adopts an IC card as a portable electronic apparatus according to the present invention. More specifically, in this card handling system, an IC card can be connected to central processing unit (CPU) 3 via card reader/writer 2, and CPU 3 is connected to keyboard 4, CRT display unit 5, printer 6, and floppy disk unit 7. IC card 1 is owned by a user and is used when a PIN (personal identification number) known only to the user is referred to or when necessary data is stored therein. FIG. 2 shows its function blocks.

Referring to FIG. 2, card 1 comprises sections for executing basic functions such as read/write section 11, PIN setting/collating section 12, and encrypting/decrypting section 13, and supervisor 14 for managing these basic functions. Read/write section 11 reads, writes, or erases data with respect to data memory 16. PIN setting/collating section 12 stores the PIN set by the user, prohibits readout of the PIN, collates the PINs when a PIN is input, and gives permission for the following processing. Encrypting/decrypting section 13 encrypts communication data in order to prevent leakage or copying of the communication data when data is to be transmitted from CPU 3 to another terminal unit via, e.g., a communication network, and decrypts encrypted data. Encrypting/decrypting section 13 has a function to perform data processing in accordance with an encrypting algorithm, e.g., DES (Data Encryption Standard), which has a sufficient encryption power. Supervisor 14 decrypts a funtion code input from reader/writer 2 or a function code appended to data, and selects and executes a necessary function among the basic functions.

Figure 3:
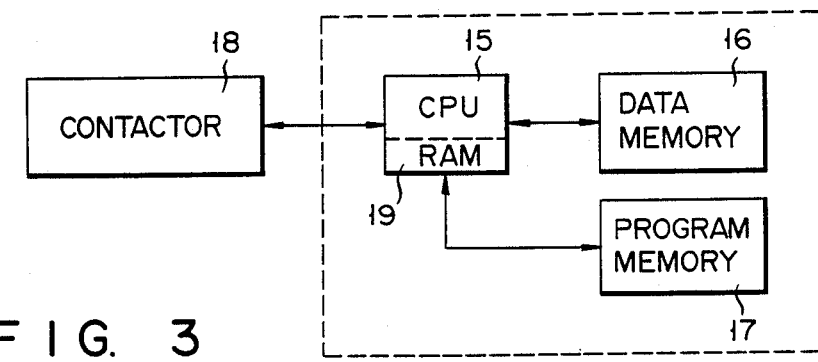
FIG. 3 is a block diagram showing the arrangement of an IC chip incorporated in the IC card shown in FIG. 2.

In order to perform these various functions, IC card 1 consists of CPU 15 as the control section, non-volatile data memory 16 as the data memory section whose memory content can be erased, program memory 17, and contact section 18 for obtaining an electrical contact with card reader/writer 2 as shown in, e.g., FIG. 3. Among these components, CPU 15 and memories 16 and 17, surrounded by a broken line, are constituted by a single IC chip. CPU 15 has random access memory (RAM) 19. Memory 17 comprises, e.g., a mask ROM and stores a control program for CPU 15 that has a subroutine for enabling the basic functions described above. Memory 16 is used for storing various data and comprises, e.g., an EEPROM.

Figure 4:
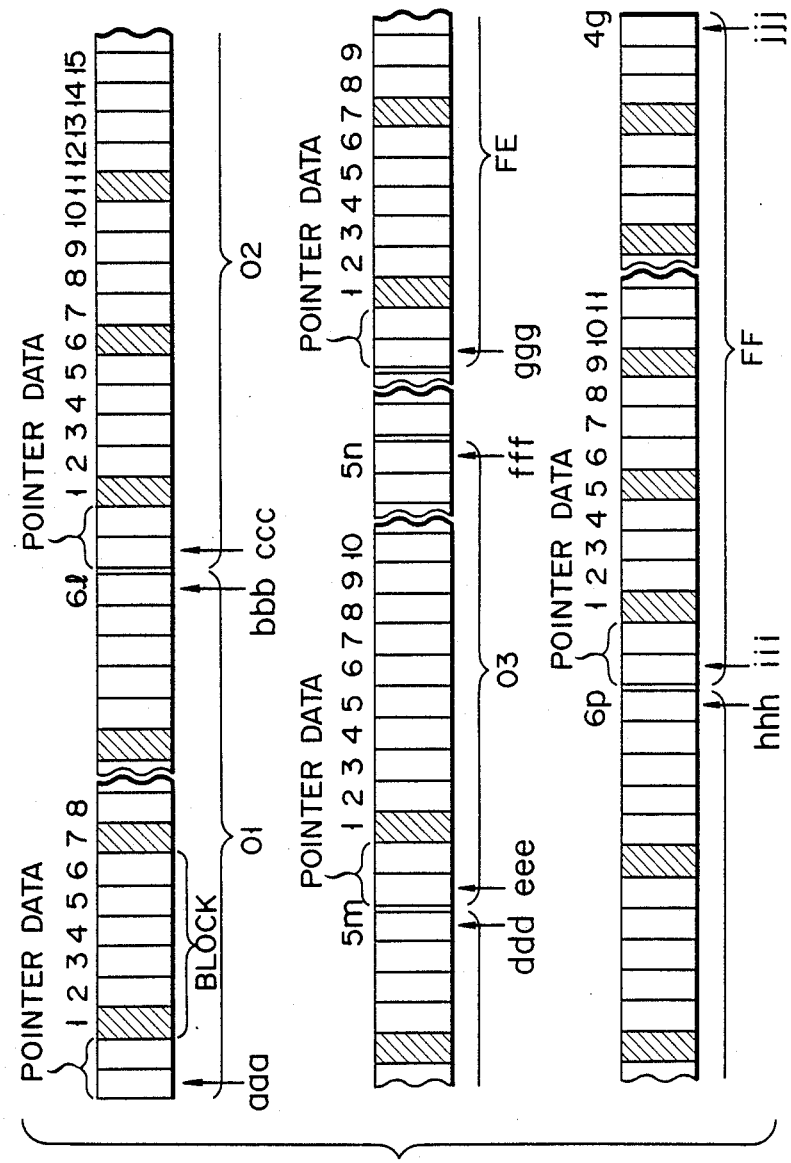
FIG. 4 is a detailed memory format of a data memory shown in FIG. 3.
Figures 5, 6:
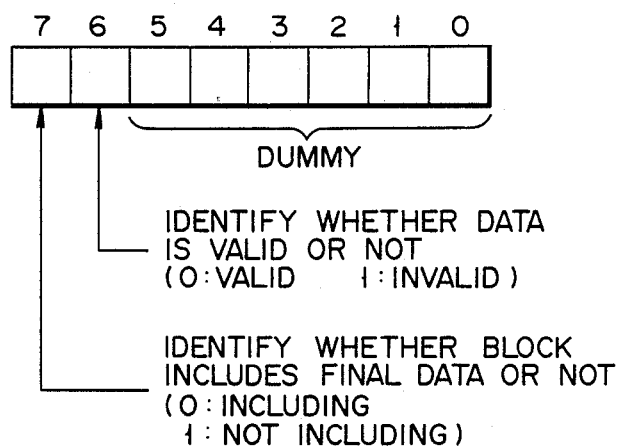
FIG. 5 is a view of the are "00" of the data memory shown in FIG. 3.
FIG. 6 shows the format of the attribute data stored in the hatched portions shown in FIG. 4.

Data memory 16 is divided into a plurality of areas as shown in FIG. 4. Each of these areas is divided into a single block or a plurality of blocks. Each block is constituted by a predetermined number of bytes. Processing is performed in units of blcoks. One block consists of attribute data (1 byte) (hatched portion in FIG. 4) and storage data. Area numbers "00" to "FF" are assigned to corresponding areas, each divided as shown in FIG. 4. Among them, area "00" consists of area number field 20, the number of bytes field 22, start address field 24 indicating a start address of each area, and final address field 26 indicating a final address of each area, as shown in FIG. 5. The start address of area "01" is address aaa and the final address thereof is address bbb. One block consists of 6 bytes. The number of bytes of storage data is 5 bytes per block. An area is provided in the start of each area in order to store an address (to be referred to as pointer data hereinafter) of a final byte of a final block when the final block is written upon data writing. Attribute data includes an identifier indicating whether the corresponding storage data is valid or not, and another identifier indicating whether the corresponding block is a block storing the final data when a string of storage data consists of a plurality of blocks.

FIG. 6 shows the format of the attribute data. As shown in FIG. 6, the 6th bit is an identifier indicating whether the storage data in the corresponding block is valid or not. If this bit is "1", the storage data is invalid; if "0", the storage data is valid. The 7th bit is an identifier indicating whether the corresponding block is a block including a final byte of a string of data. If this bit is "1", the corresponding block is a block not including the final byte; if "0", the corresponding block is a block including the final byte. Note that 0th to 5th bits are dummy bits.

Figure 7B:
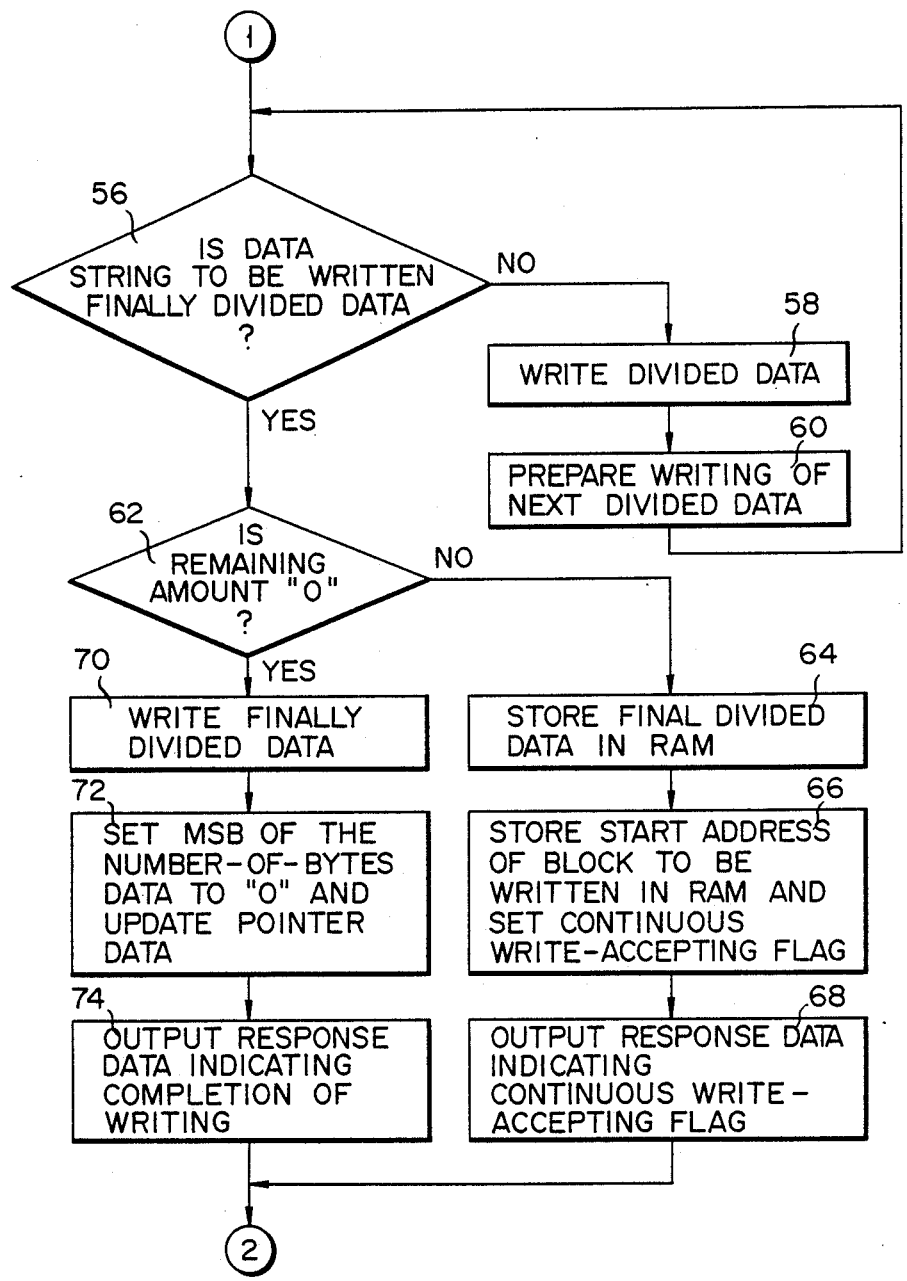

A data write operation for data memory 16 of IC card 1 with the above arrangement will be described with reference to the flow charts shown in FIGS. 7A and 7B.

Figure 8:
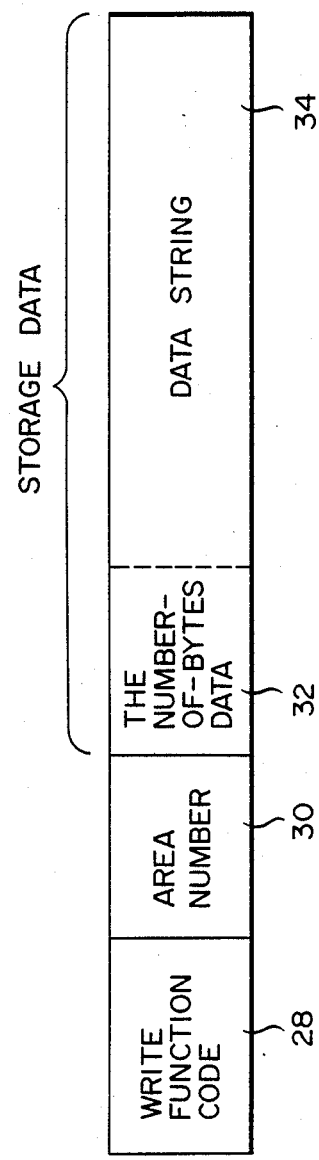
FIG. 8 shows the format of the write instruction used in the write operation shown in FIGS. 7A and 7B.

Data writing to data memory 16 of IC card 1 is performed when instruction data having a format as shown in FIG. 8 is supplied to card 1 via card reader/writer 2 from CPU 3, shown in FIG. 1, and when CPU 15 executes the instruction. The writing instruction consists of write function code field 28, area number field 30, the number of bytes data field 32, and data string field 34. Storage data consists of a data string to be stored, and the number of bytes data (to be referred to as the number of bytes in the data string hereinafter) constituting the data string.

In a normal state, an instruction wait mode for card reader/writer 2 is set. In this case, when instruction data is input from reader/writer 2, CPU 15 checks in step 36 whether the function code included in the instruction data is for writing or not. If YES instep 36, CPU 15 finds in step 38 an area number appended to the instruction data from area "00" of data memory 16. If the corresponding area number is not found (NO in step 38), CPU 15 outputs in step 40 response data indicating that a corresponding area is not found to card reader/writer 2, and the flow returns to an instruction data wait mode for waiting for instruction data from reader/writer 2. If YES in step 38, CPU 15 refers to the corresponding processing unit data. When storage data is to be written in an area, CPU 15 refers to the pointer data located at the start of the area in step 42, and checks the start address. Subsequently, in step 44, CPU 15 compares the number of bytes data in the instruction data and the capacity (the number of bytes) of each area shown in FIG. 5 in order to determine whether all the input storage data can be stored in the area. If NO in step 44, CPU 15 outputs response data indicating that the number of bytes data is in error to reader/writer 2, in step 48, and the flow returns to the instruction data wait mode for reader/writer 2. If YES in step 44, CPU 15 compares the number of bytes in the data string with the number of bytes data included in the input instruction data, in step 46. Such a checking is necessary to write the number of bytes in a divisional manner, since a data string having the number of bytes indicated by the number of bytes data cannot always be written by a single operation. As the result of this checking, if the former is larger than the latter (if YES in step 46), CPU 15 outputs response data indicating that the number of bytes data is in error to reader/writer 2, in step 48, and the flow returns to the instruction data wait mode. Otherwise (if NO in step 46), the number of bytes in the data string is subtracted from the number of bytes data to obtain the result as the remaining amount, in step 50.

In step 52, CPU 15 of card 1 sets the MSB (Most Significant Bit) (field 32 of FIG. 8) of the bit string constituting the number of bytes data shown in FIG. 8 to "1", thereby temporarily invalidating the storage data. Subsequently, in step 54, CPU 15 divides the storage data into processing units, appends attribute data to each of the divided data, and stores them. More specifically, in step 56, CPU 15 checks if the data string to be written is the final divided data. If NO in step 56, the divided data is written in data memory 16 in step 58, and the next divided data to be written is prepared in step 60.

If YES in step 56, it is checked in step 62 whether the remaining amount is "0". In this case, if the remaining amount held in advance is "0" (YES in step 62), the final divided data is written in step 70, and the MSB of the bit string constituting the number of bytes data shown in FIG. 8 is set to "0" in step 72. Thus, the storage data is validated and the final address of the block including the final byte of the storage data string is stored as pointer data. In step 74, CPU 15 outputs response data indicating completion of writing, and the flow returns to the instruction data wait mode. However, if NO in step 62, CPU 15 does not store only the final divided data but holds it in an internal RAM, in step 64. Subsequently, in step 66, CPU 15 sets the continuous write-accepting flag and holds the start address of the next unwritten block in the RAM as a write start address. In step 68, CPU 15 outputs response data indicating continuous write-acceptance, and the flow returns to the instruction data wait mode.

Figure 10:
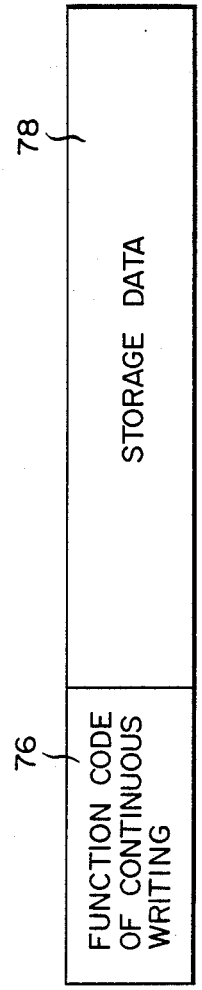
FIG. 10 shows the format of a continuous write instruction used in the continuous write operation shown in FIGS. 9A and 9B.
Figure 9B:
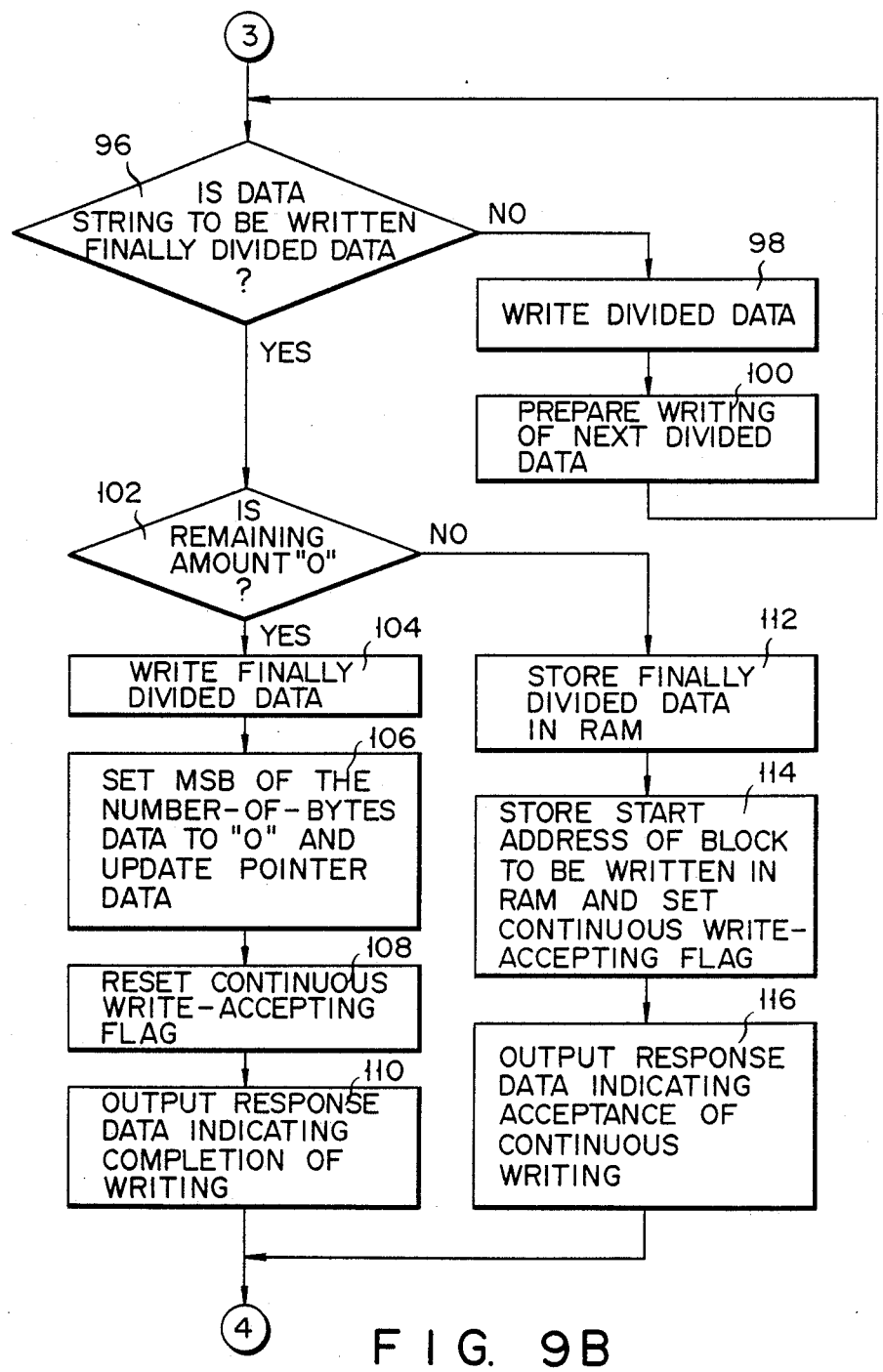

A continuous write operation will be described with reference to the flow charts shown in FIGS. 9A and 9B. When continuous writing is performed, continuous writing instruction data having a format as shown in FIG. 10 is input. The continuous writing instruction data consists of continuous writing function code field 76 and storage data field 78. When it is determined in step 80 that continuous writing instruction data is input (if YES in step 80), CPU 15 refers to the continuous write-accepting flag and checks if the flag is set, in step 82. If NO in step 82, CPU 15 outputs response data indicating a sequence error to card reader/writer 2 in step 84, and the flow returns to the instruction data wait mode.

If YES in step 82, CPU 15 checks the number of bytes of the input storage data and the remaining amount, in step 86. As the result of the checking in step 82, if the former is larger than the latter (YES in step 86), CPU 15 otputs response data indicating that the number of bytes data is in error, in step 88, and the flow returns to the instruction data wait mode. Otherwise, (if NO in step 86), CPU 15 subtracts the former from the latter and holds the subtraction result as a new remaining amount, in step 90.

Subsequently, in step 92, CPU 15 generates new storage data by appending previous final divided data, held in advance in the RAM, to the leader of the input storage data. In step 94, CPU 15 divides the new storage data in processing unit data and appends attribute data to the respective divided data. Then, CPU 15 stores data based on the write start address held in the RAM in advance. More specifically, CPU 15 divides data in processing units in step 94, and checks in step 96 if the data string to be written is the final divided data. If NO in step 96, the divided data is written in step 98, preparation for writing the next divided data is performed in step 100, and the flow returns to step 96.

If YES in step 96, it is checked in step 102 whether the remaining amount is "0". If YES in step 102, the final divided data is written in step 104, the MSB of the number of bytes data is set to "0" in step 106, and the pointer data is updated. Subsequently, CPU 15 resets the continuous write-accepting flag in step 108, and outputs respoonse data indicating completion of writing in step 110.

If NO in step 102, the final divided data is stored in the RAM in step 112. In step 114, the start address of the block to be written next is stored, and the continuous write-accepting flag is set. In step 116, CPU 15 outputs response data indicating acceptance of continuous writing, and the flow returns to the instruction data wait mode.

In this manner, a data string which cannot be written by a single transmission is stored. In a block for storing final divided data in a case when the remaining amount is "0", the 7th and 6th bits are both set to "0".

For example, assume that instruction data as shown in FIG. 11A is input. This corresponds to write instruction data and its target area is "02". The number of processing unit bytes of area "02" is 4. First, the number of bytes data in the input instruction data is extracted. Simultaneously, the pointer data located at the start of area "02" is referred to to check that all the storage data can be stored. Then, the MSB of the number of bytes data is set to "1" (FIG. 11B). Subsequently, the remaining amount is set from the number of bytes of the storage data and the value of the number of bytes data (FIG. 11C). The storage data is divided by the number of processing unit bytes (FIG. 11D) and stored in area "02", as shown in FIG. 11E. However, since the remaining amount is other than "0", the final divided data is not stored. Then, an address to be written next is held, and the continuous write-accepting flag is set.

Figure 11H:
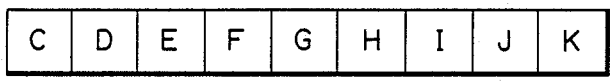
Figure 11I:
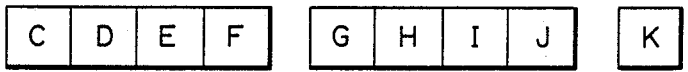
Figure 11J:
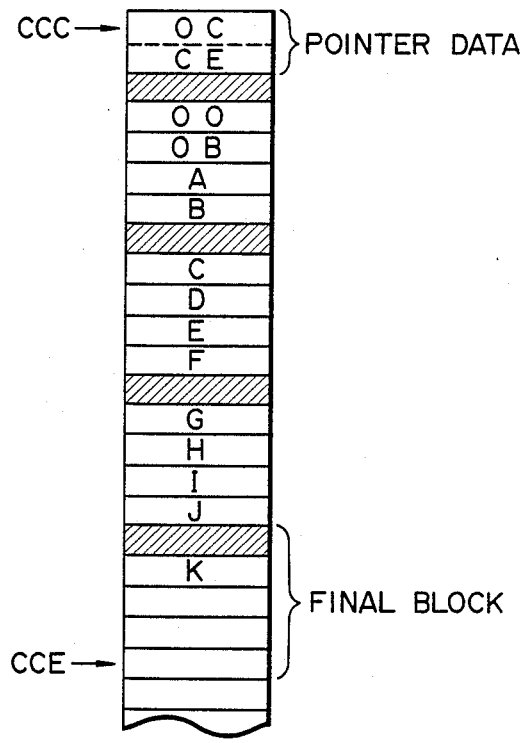

In this state, assume that the continuous write instruction data as shown in FIG. 11F is input. Then, the number of bytes of storage data in this instruction data is checked. If the checked result is acceptable, a new remaining amount is set from the previous setting amount and the number of bytes of the current storage data (FIG. 11G). The previously held final divided data and the current storage data are combined (FIG. 11H). The resultant storage data is divided by the number of processing unit bytes (FIG. 11I) and stored in accordance with the previously stored write address (FIG. 11J). In this case, since the remaining amount is "0", the MSB of the number of bytes data is set to "0", and the final address is stored as the pointer data.

Figure 12B:
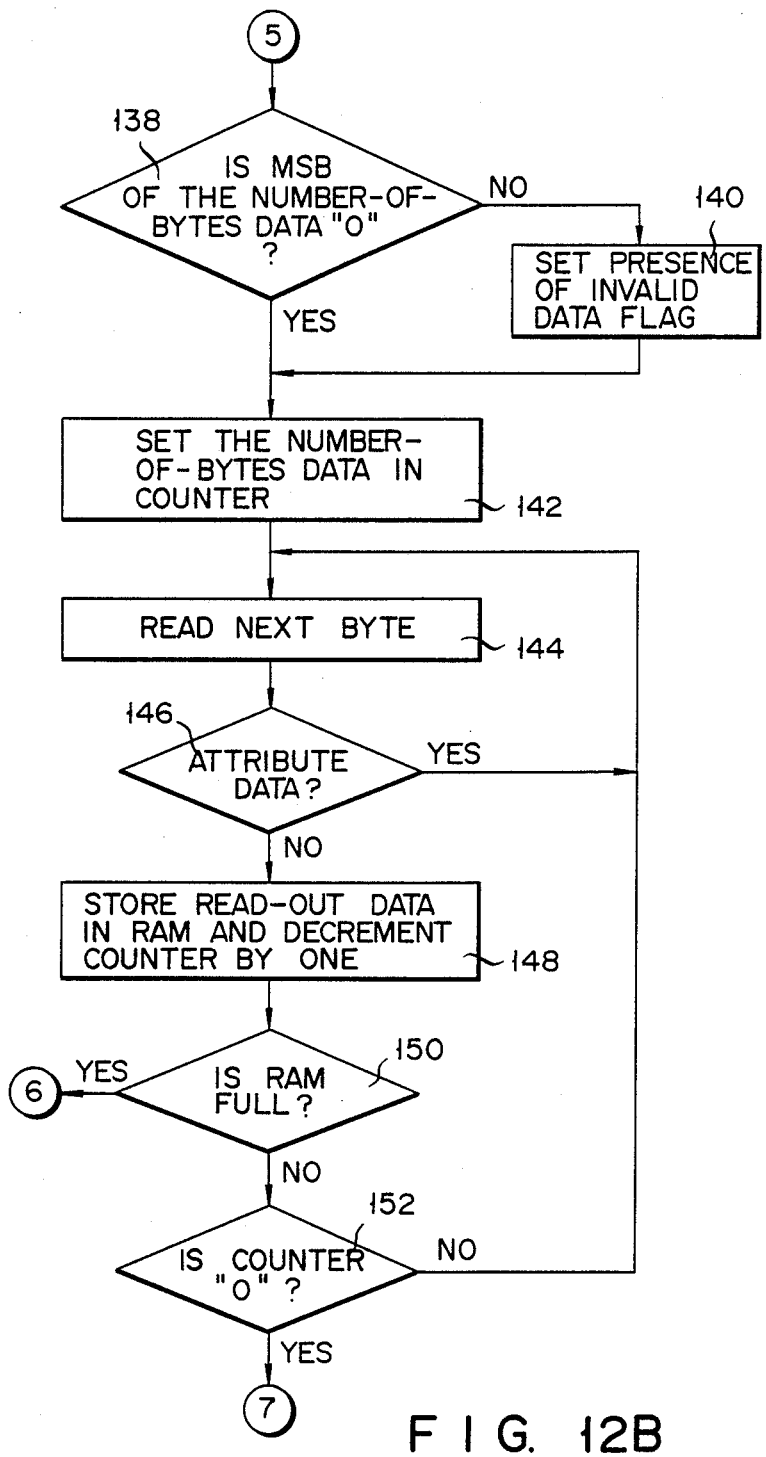
Figure 12C:
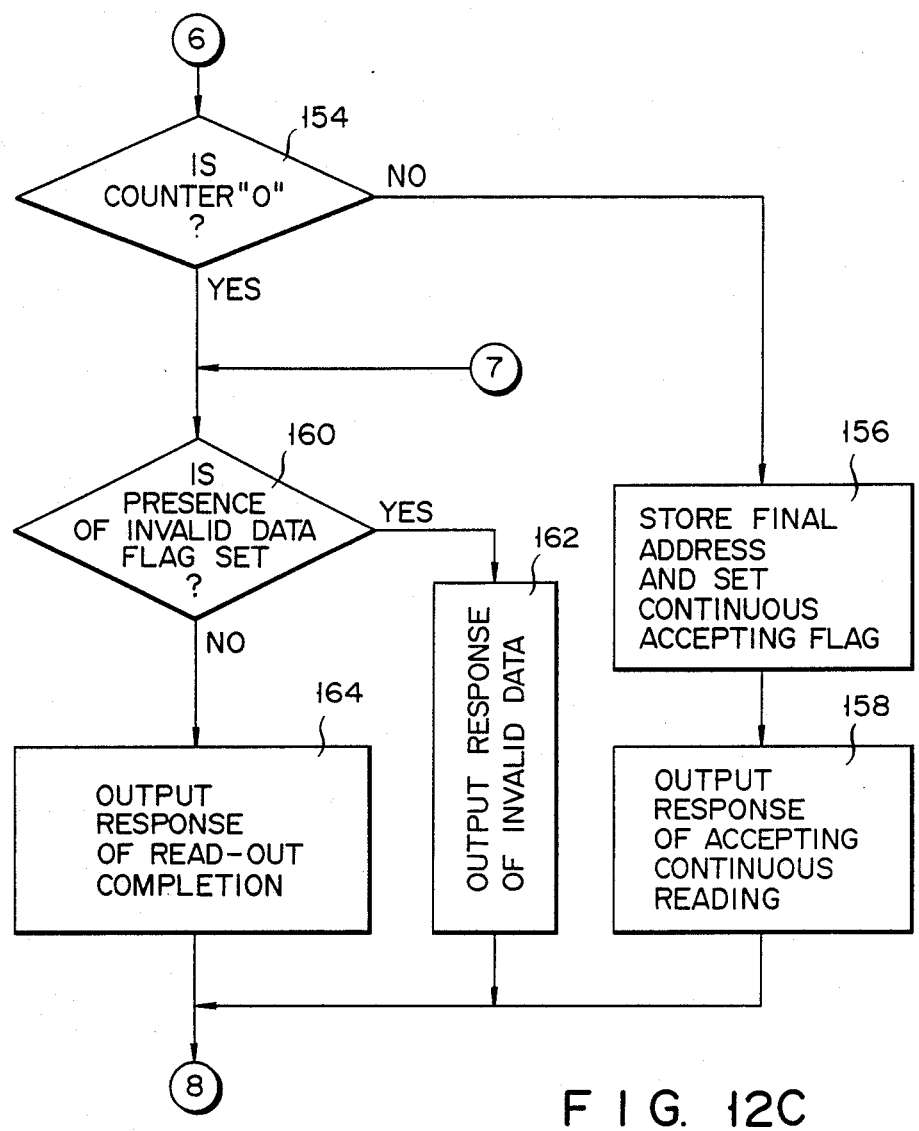
Figure 13:
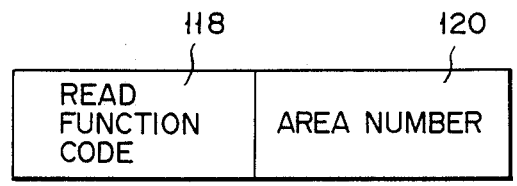
FIG. 13 shows the format of a read-out instruction used in the read operation shown in FIGS. 12A through 12C.

A data read operation for data memory 16 will be described with reference to the flow charts shown in FIGS. 12A through 12C. When data stored in data memory 16 is to be read out, read instruction data having a data format as shown in FIG. 13 is input. This read instruction data consists of read function code 118 and area number 120. In a normal state, an instruction data wait mode to wait for an instruction from card reader/writer 2 is set. In this case, when instruction data is input from reader/writer 2, CPU 15 checks in step 122 whether the function code included in the instruction data is for reading. If YES in step 122, CPU 15 finds an area number appended to the instruction data from area "00" of data memory 16, in step 124. If the corresponding area number is not found (NO in step 124), CPU 15 outputs response data indicating that the corresponding area is not found in step 126, and the flow returns to the instruction data wait mode of step 122. If the corresponding area number is found (YES in step 124), CPU 15 refers to the corresponding processing unit data, and stores it in the RAM that stores the start and final addresses of that area. When data in, this area is to be read out, in step 128, CPU 15 refers to pointer data located at the start of the area. If it is determined in step 128 that all the bits of this pointer data are "1" (YES in step 128), CPU 15 determines that no data is stored in this area, an output response indicating that the area is unwritten is indicated in step 130, and the flow returns to the instruction data wait mode of step 122. However, if it is determined in step 128 that not all the bits of the pointer data are "1" (NO in step 128), CPU 15 recognizes the start block of the most recent data in this area based on this pointer data in step 132. The number of bytes data is stored in this start block.

Subsequently, CPU 15 checks if the number of bytes data is valid, in step 134. If NO in step 134, CPU 15 outputs response data indicating that the number of bytes data is in error in step 136. However, if YES in step 134, CPU 15 checks in step 138 if the MSB of the number of bytes data is "0". If NO in step 138 (if the MSB of the number of bytes data is "1"), CPU 15 determines that a data string following this MSB is invalid, and sets the presence of invalid data flag in step 140. However, if YES in step 138, CPU 15 sets the number of bytes data in the counter in step 142. Subsequently, CPU 15 reads out the next byte in step 144, and checks in step 146 whether the readout byte is attribute data. If YES in step 146, the flow returns to step 144 and the next one byte is read out. If NO in step 144, the readout data is stored in the RAM and the content of the counter is decremented by one, in step 148. In step 150, it is checked whether the RAM is full. If NO in step 150, it is checked in step 152 whether the counter is "0". If NO in step 152, the flow returns to step 144, and the next byte is read out.

However, if YES in step 150, the flow advances to step 154 and it is checked whether the counter is "0". If NO in step 154, CPU 15 stores a readout final address in the RAM and sets a continuous read-accepting flag, in step 156. Then, in step 158, CPU 15 outputs response data which indicates acceptance of continuous reading and is appended with the data string in the RAM, and the flow returns to step 122.

However, if YES in step 154, CPU 15 checks in step 160 whether the presence of invalid data flag is set. If YES in step 160, CPU 15 outputs response data which indicates invalid data and is appended with the data string in the RAM, in step 162, and the flow returns to step 122. However, if NO in step 160, CPU 15 outputs response data which indicates read-out completion and is appended with the data string of the RAM, in step 164, and the flow returns to step 122.

Figure 14A:
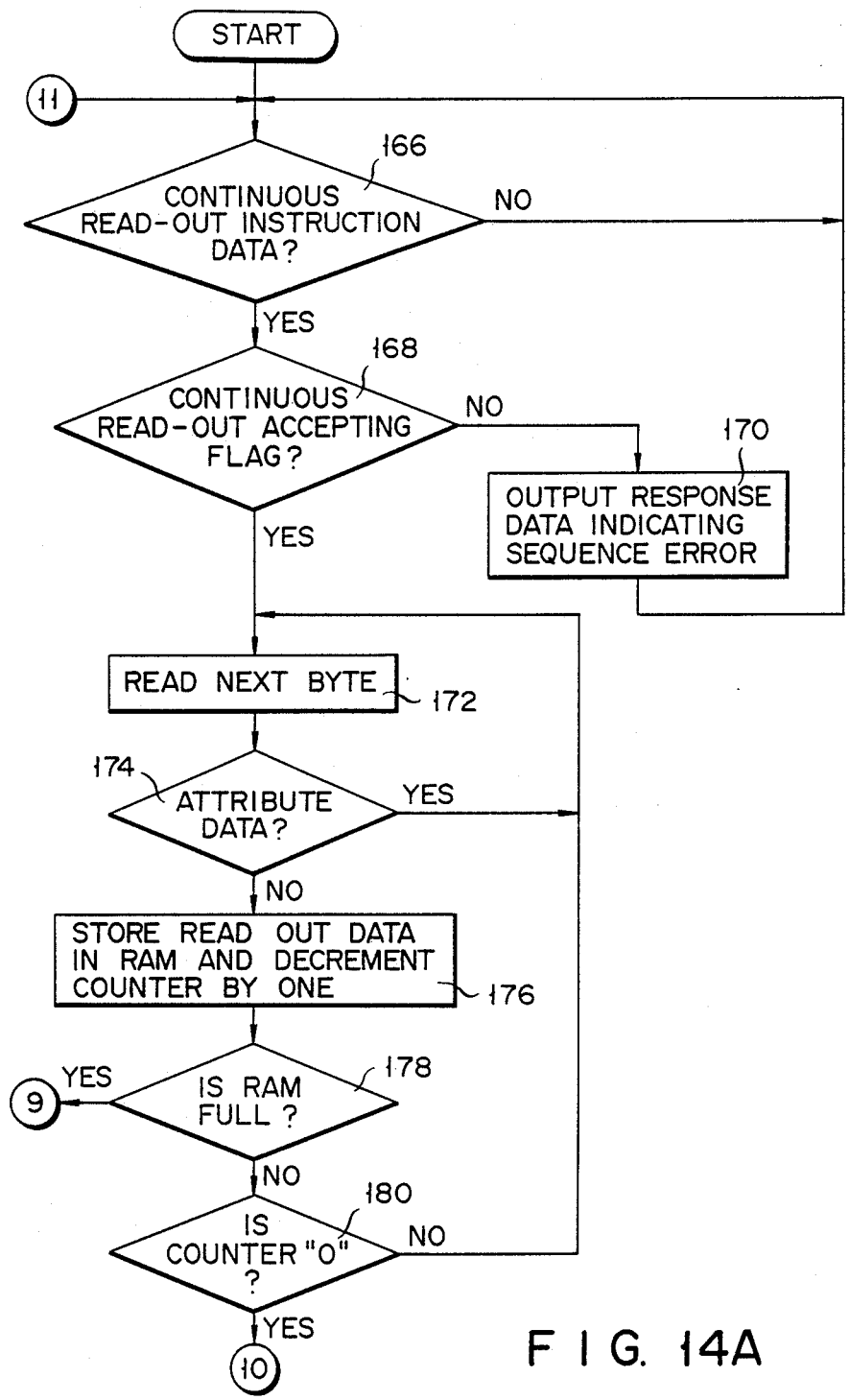
FIGS. 14A and 14B are flow charts of a continuous read operation for the data memory shown in FIG. 3.
Figure 14B:
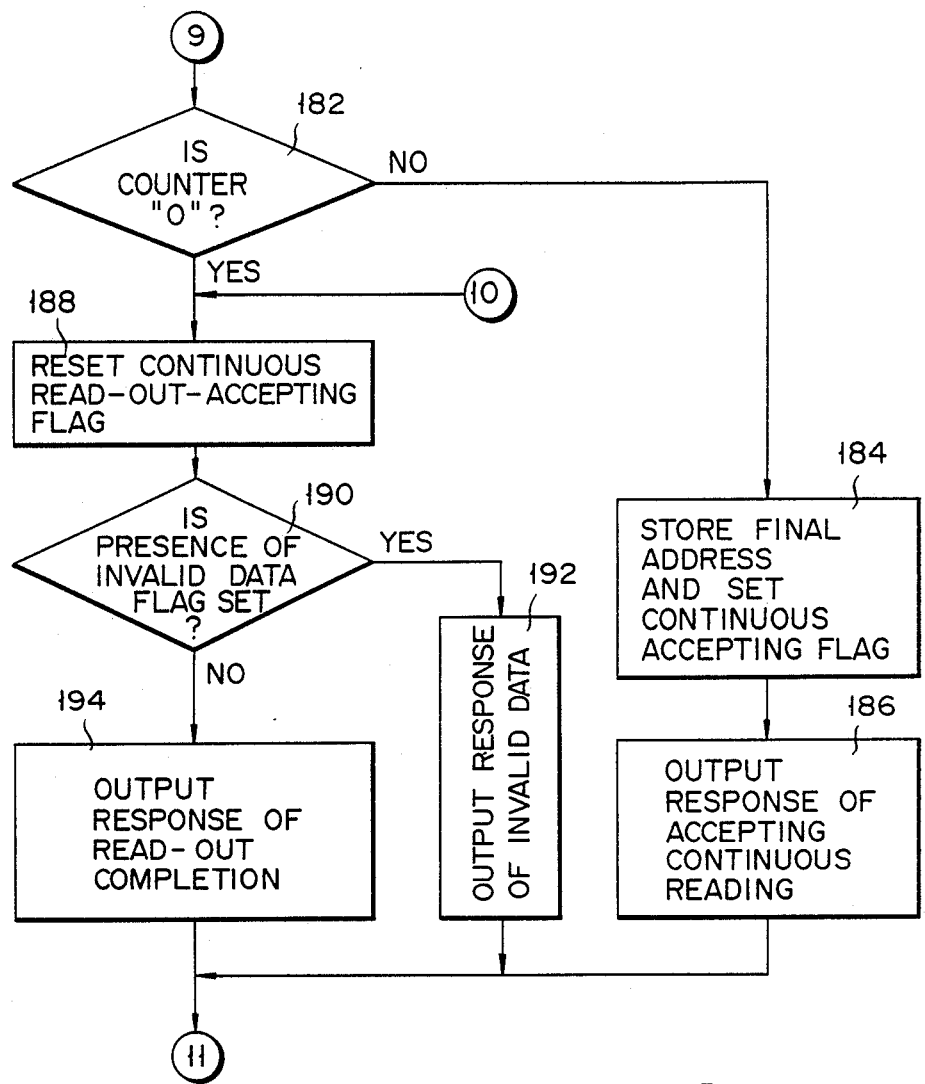
Figure 15:
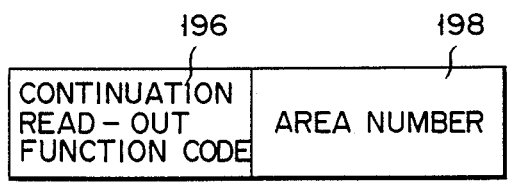
FIG. 15 shows the format of a continuous read instruction used in the continuous read operation shown in FIGS. 14A and 14B.

A continuous read-out operation will be described with reference to the flow charts of FIGS. 14A and 14B. When continuous read-out is performed, continuous read instruction data having a format as shown in FIG. 15 is input. The continuous read-out instruction data consists of continuation read-out function code field 196 and area number field 198. When it is determined in step 166 that a continuous read-out instruction is input, CPU 15 checks in step 168 whether a continuous read-out accepting flag is set. If NO in step 168, CPU 15 outputs response data indicating a sequence error in step 170, and the flow returns to step 166 to wait for continuous read-out instruction data. If YES in step 168, the next byte data is read out in step 172. Subsequently, CPU 15 checks in step 174 whether the read-out byte data is attribute data. If YES in step 174, the flow returns to step 172 and the next byte data is read. However, if NO in step 174, CPU 15 stores the readout data in the RAM and decrements the counter by one, in step 176. In step 178, CPU 15 checks whether the RAM is full. If NO in step 178, CPU 15 checks in step 180 whether the counter is "0". If NO in step 180, the flow returns to step 172 and the next byte data is read.

If YES in step 180, the flow of CPU 15 advances to step 188.

In step 178, if the RAM is full (if YES in step 178), the flow of CPU 15 advances to step 182 and checks whether on the other hand, the content of the counter is "0". If NO in step 182, the flow advances to step 184 to store the readout final address in the RAM. Then, in step 186, CPU 15 outputs response data which indicates acceptance of continous reading and is appended with the data string of the RAM, and the flow returns to step 166.

If YES in step 182, CPU 15 resets the continuous read-out-accepting flag in step 188, and it is checked in step 190 whether the presence of invalid data flag is set. If YES in step 190, in step 192, CPU 15 outputs response data which indicates invalid data and is appended with the data string in the RAM, and the flow returns to step 166. However, if NO in step 190, CPU 15 outputs response data which indicates read-out completion and is appended with the data string of the RAM, in step 194, and the flow returns to step 166.

Figure 16A:
FIGS. 16A through 16F are diagrams for explaining a practical read operation shown in FIGS. 12A through 12C.
Figure 16B:
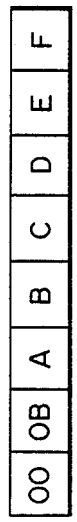
Figure 16C:
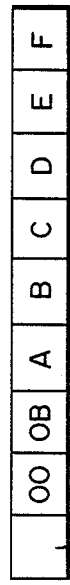
Figure 16D:
Figure 16E:
Figure 16F:
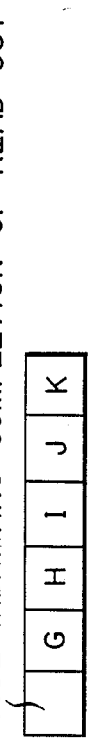

For example, assume that an area (area "02") of the state as shown in FIG. 11J is to be read out by the read-out instruction as shown in FIG. 16A. Note that the capacity of the RAM is, e.g., 8 bytes. In this case, the data string which is read out by this instruction data is a data string as shown in FIG. 16B, and the number of bytes data indicates 1 byte. Therefore, the counter is "5" when it is stored in the RAM. Since the count is other than "0", this data string is appended to the response data indicating acceptance of continuous read-out, and is output (FIG. 16C). When continuous read-out instruction data as shown in FIG. 16D is input, a data string as shown in FIG. 16E is set in the RAM. In this case, since the count is "0", this data string is appended to the response data indicating read-out completion, and is output (FIG. 16F).

Figure 17:
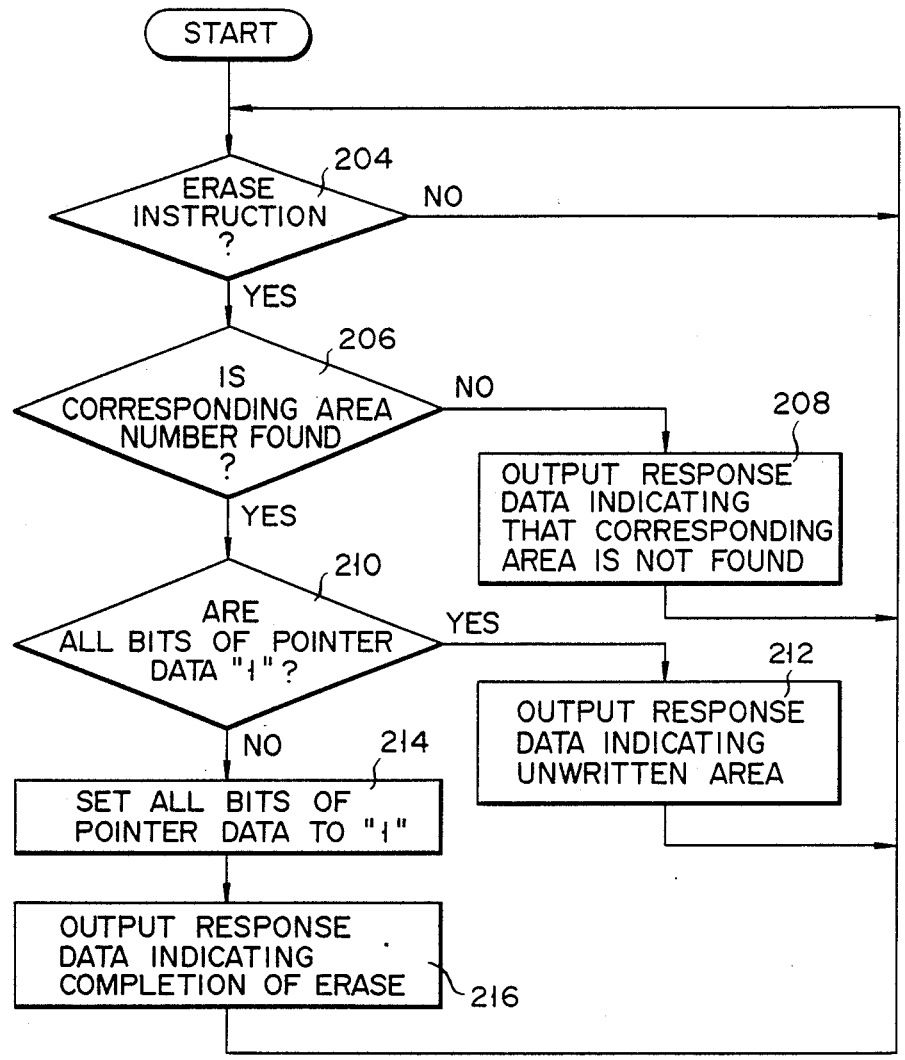
FIG. 17 is a flow chart for explaining an erasure operation for the data memory shown in FIG. 3.
Figure 18:
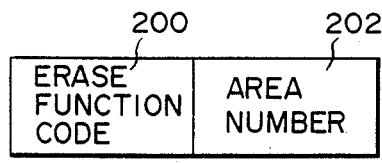
FIG. 18 shows the format of an erase instruction used in the erasure operation.

The erasure operation for data memory 16 will be described with reference to the flow chart of FIG. 17. When the data stored in memory 16 is to be erased, erase instruction data having a format as shown in FIG. 18 is input. The erase instruction data consists of erase function code field 200 and area number field 202. In step 204, when it is determined that an erase instruction is input, CPU 15 finds an area number appended to the instruction data from area "00" of data memory 16, in step 206. If the corresponding area number is not found in step 206 (NO in step 206), CPU 15 outputs response data indicating that the corresponding area is not found, in step 208, and the flow returns to step 204 to wait for the next instruction. If YES in step 206, CPU 15 refers to the start address of that area to confirm the pointer data of this area. More specifically, CPU 15 checks in step 210 whether all the bits of pointer data are "1". If YES in step 210, CPU 15 outputs response data indicating an unwritten area in step 212, and the flow returns to step 204.

However, if NO in step 210 (if not all the bits of the pointer data are "1"), CPU 15 outputs response data indicating completion of erasure in step 216, and the flow returns to step 204. In this case, CPU 15 sets all the bits of this pointer data to "1" (i.e., writes FFF) in step 214, outputs response data indicating completion of erasure, and the flow returns to the instruction data wait mode of step 204.

In the above embodiment, as shown in FIG. 3, CPU 15, data memory 16 and program memory 17 are integrated into a single chip. However, they can be formed in different chips. The hardware arrangement of the portable electronic device can be modified within the spirit and scope of the present invention.

Furthermore, in the above embodiments, an IC card has been exemplified as a portable electronic device. The shape of the portable electronic device is not limited to a card-like shape, but can be a block-like shape or a pencil-like shape.

What is claimed is:

1. A portable electronic apparatus comprising:
    contactor means, couplable to a portable electronic apparatus handling system, for receiving a write instruction including a write function field, a write area number field, a write data string length field, and a write data string field from said portable electronic apparatus handling system;
    storage means which is divided into a plurality of areas, each of the areas having a pointer data field indicating a final location thereof where data is written, for storing in a specific area at least data for recognizing a final address of each of the areas and a data string supplied from said portable electronic apparatus handling system;
    reading means for reading out from said storage means data recognizing the final address of the area designated by a write area number field of the write instruction and pointer data from said storage means in response to a write instruction supplied from said portable electronic apparatus handling system;
    calculating means for calculating a memory capacity from the values of the final address and the pointer data read by said reading means;
    comparing means for comparing the memory capacity calculated by said calculating means with a value of the write data string length field of the write instruction;
    determining means for determining whether a data string which has been requested to be written can be written entirely; and
    writing means for writing the data string to said storage means when said determining means determines that the data string can be written.

2. An apparatus according to claim 1, wherein said writing means writes a data string, which has been requested to be written, in said storage means only when it is determined that the data string can be entirely written.

3. An apparatus according to claim 1, wherein said writing means feeds back the determination performed by said determining means to said portable electronic apparatus handling system.

4. An apparatus according to claim 1, wherein said writing means is a portion of a microcomputer.

5. An apparatus according to claim 1, wherein said storage means comprises an electrically erasable read only memory.

* * * * *